United States Patent [19]

Thelen

[11] Patent Number: 4,693,860

[45] Date of Patent: Sep. 15, 1987

[54] METHOD OF CONVEYING PARTICULATE MATS

[75] Inventor: Werner Thelen, Kempen, Fed. Rep. of Germany

[73] Assignee: G. Siempelkamp GmbH & Co., Krefeld, Fed. Rep. of Germany

[21] Appl. No.: 898,036

[22] Filed: Aug. 19, 1986

Related U.S. Application Data

[62] Division of Ser. No. 767,956, Aug. 21, 1985.

[30] Foreign Application Priority Data

Aug. 24, 1984 [DE] Fed. Rep. of Germany ....... 3431126

[51] Int. Cl.[4] ........................ B29C 59/04; B65G 47/64

[52] U.S. Cl. .................................... 264/320; 198/617; 264/118; 264/119

[58] Field of Search ............... 264/109, 118, 119, 120, 264/320; 198/460, 461, 462, 575, 586, 588, 594, 597, 631, 750, 617; 425/135, 168, 142, 145, 161, 329, 335, 337, 324.1, DIG. 108, 308, 289, 296, 297, 406, 110, 371; 100/151, 152, 153, 194, 196, 207; 156/555, 556, 580, 583.5

[56] References Cited

U.S. PATENT DOCUMENTS

| | | | |
|---|---|---|---|
| 3,887,314 | 6/1975 | Andresen et al. | 425/371 |
| 4,047,865 | 9/1977 | Axer | 425/371 |
| 4,372,899 | 2/1983 | Wiemann | 425/371 |

*Primary Examiner*—Jan H. Silbaugh

*Assistant Examiner*—J. F. Durkin, II

*Attorney, Agent, or Firm*—Karl F. Ross; Herbert Dubno; Andrew Wilford

[57] ABSTRACT

Particulate mats are transported from the downstream end of an upstream conveyor normally moving continuously in a longitudinal transport direction at a predetermined relatively slow speed to a press downstream in the direction from the upstream conveyor that receives the mats and presses them into hard panels by supporting the mats between the upstream conveyor and the press on a downstream conveyor having an upstream end spaced downstream from the downstream end and a downstream end at the press and an intermediate conveyor extending between the upstream end of the downstream conveyor and the downstream end of the upstream conveyor and having a length in the direction at least equal to that of each of the mats in the direction. A carriage supporting the downstream end of the upstream conveyor, the intermediate conveyor, and the upstream end of the downstream conveyor is reciprocated in the direction at a frequency related to mat size and speed. The upstream conveyor moves generally only at a first relatively slow transport speed in the direction and the downstream conveyor moves generally always at a substantially higher transport speed in the direction, but the intermediate conveyor moves at the slow speed when a mat is bridging it and the upstream conveyor and at the higher speed when a mat is bridging it and the downstream conveyor.

2 Claims, 4 Drawing Figures

METHOD OF CONVEYING PARTICULATE MATS

This is a divisional of co-pending application Ser. No. 767,956, filed on Aug. 21, 1985.

FIELD OF THE INVENTION

The present invention relates to a particleboard-making apparatus. More particularly this invention concerns a speed-change or transfer conveyor for such an apparatus.

BACKGROUND OF THE INVENTION

Particle board is made by depositing a continuous band of fibers and binder on a continuously moving belt, subdividing this continuous band into individual mats, and then pressing the individual mats into rigid panels. The band formation is described in commonly owned patent application Ser. No. 356,298 filed Mar. 10, 1982 now abandoned by Werner Ufermann et al and in the other applications and references cited therein. The press is similarly described in copending application No. 411,109 filed Aug. 24, 1982 by Klaus Gerhardt, now U.S. Pat. No. 4,468,188, as well as in copending applications Ser. No. 719,757, now U.S. Pat. No. 4,645,632 and Ser. No. 719,759, now U.S. Pat. No. 4,647,417, both filed by Friedrich Boettger et al. The deposition and longitudinal subdivision of the mat take place on a moving support surface, but it is normally necessary to arrest the mat to press it.

Thus a transfer conveyor is provided between the continuously moving conveyor belt of the mat-forming equipment and the intermittently moving belt of the press to separate and speed up the mats once they are cut from the band. In a standard system described in German patent document No. 1,166,093 filed Dec. 31, 1960 by Eugen Siempelkamp a single belt conveyor is provided having an upper stretch that terminates at its downstream end at the upstream end of the press conveyor and at its upstream end at the downstream end of the upstream mat-forming conveyor. Means is provided to jointly reciprocate the meeting place or joint at the downstream end of the upstream conveyor and the upstream end of the transfer conveyor, appropriate tensioners being provided to keep the two belts tight. The transfer conveyor is driven part of the time at the same slow speed as the downstream conveyor, and the rest of the time at a substantially higher speed, and the joint is moved at least in the downstream direction generally at the same speed as the downstream conveyor.

The reciprocation of the transfer joint is synchronized with the cutting of the band into mats and with the change in speed of the transfer conveyor so that as soon as a mat moves wholly onto the transfer conveyor, in the fully upstream position of the joint, this joint is moved downstream at the displacement rate of the mat and the transfer conveyor is speeded up. Thus the downstream mat will move rapidly away from the immediately following mat which remains just behind the moving joint. This creates a gap between succeeding mats on the transfer conveyor so that the spaced mats can be deposited on different levels of the press, or so that there is enough time between succeeding mats to stop them and press them. When the joint has moved into its furthest downstream position, the transfer conveyor is slowed down to move synchronously with the upstream conveyor, so the mat at its downstream edge can be transferred by rapid upstream movement of the joint to the transfer conveyor.

Such an arrangement functions well but must be quite long in order to create a sufficiently long gap between adjacent mats. The transfer conveyor can only operate at high speed when a mat is not bridging the joint, so that during this time it must operate slowly. In addition this frequent speed change of the transfer conveyor must be done fairly slowly, to avoid damaging the unpressed mats and because the relatively large conveyor is quite massive so its inertia makes sudden speed changes very difficult.

OBJECTS OF THE INVENTION

It is therefore an object of the present invention to provide an improved transfer conveyor for a particleboard-making apparatus.

Another object is the provision of such a transfer conveyor for a particleboard-making apparatus which overcomes the above-given disadvantages, that is which can separate succeeding mats relatively far while itself being fairly short.

A further object is the provision of an improved method of operating a conveyor system of a particleboard making apparatus.

SUMMARY OF THE INVENTION

According to this invention particulate mats are transported from the downstream end of an upstream conveyor normally moving continuously in a longitudinal transport direction at a predetermined relatively slow speed to a press downstream in the direction from the upstream conveyor that receives the mats and presses them into hard panels by supporting the mats between the upstream conveyor and the press on a downstream conveyor having an upstream end spaced downstream from the downstream end and a downstream end at the press and an intermediate conveyor extending between the upstream end of the downstream conveyor and the downstream end of the upstream conveyor and having a length in the direction at least equal to that of each of the mats in the direction. A carriage supporting the downstream end of the upstream conveyor, the intermediate conveyor, and the upstream end of the downstream conveyor is reciprocated in the direction at a frequency related to mat size and speed. The upstream conveyor moves generally only at a first relatively slow transport speed in the direction and the downstream conveyor moves generally always at a substantially higher transport speed in the direction, but the intermediate conveyor moves at the slow speed when a mat is bridging it and the upstream conveyor and at the higher speed when a mat is bridging it and the downstream conveyor.

It is possible to use the system of this invention to feed a multistage press by making the downstream end of the downstream conveyor vertically displaceable, whereby the press can have several stages.

The press according to this invention has a belt conveyor having an upstream end at the downstream end of the downstream conveyor. This belt conveyor operates intermittently, moving when operating at the higher speed to rapidly move the unpressed mat in or pressed board out.

DESCRIPTION OF THE DRAWING

The above and other features and advantages will become more readily apparent from the following, reference being made to the accompanying drawing in which.

SPECIFIC DESCRIPTION

Figure 1:
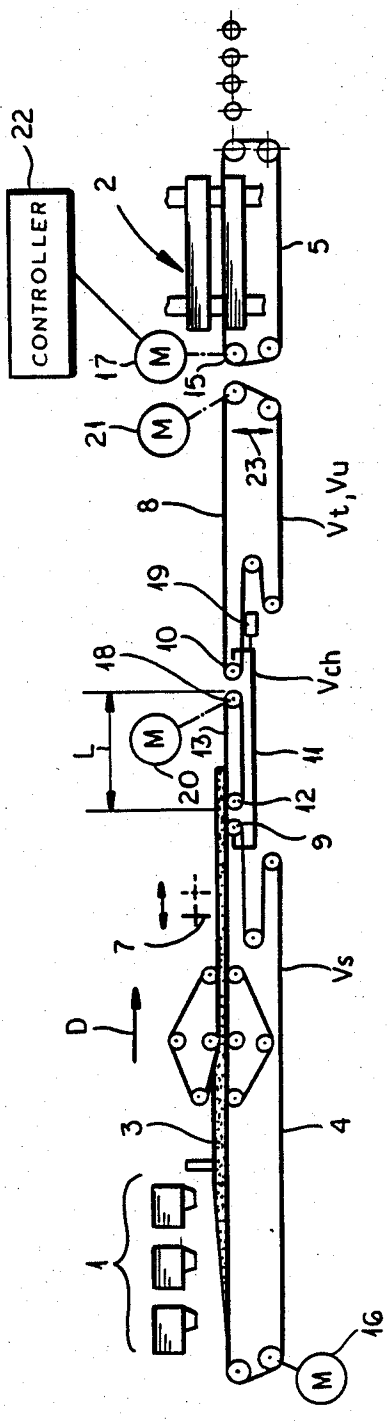
FIGS. 1 through 4 are mainly schematic side views illustrating the apparatus and method according to the present invention.

As seen in the drawing the apparatus according to this invention basically has at its upstream end relative to a travel direction D a device 1 that forms a band 3 on an upstream conveyor 4 whose upper stretch is driven by a motor 16 to move continuously in the direction D at a relatively slow speed Vs. A saw 7 displaceable in the direction D at the speed Vs transversely cuts the band 3 thus formed into discreet mats 6 that longitudinally succeed one other in the direction D. A press 2 has a belt 5 whose upper stretch is driven by a motor 17 to move intermittently at a fairly high speed Vt or Vu between periods when the press 2 is closed and is hot-pressing a mat 6 into a rigid board.

Between the downstream end of the upstream conveyor belt 4 and the upstream end 15 of the press conveyor 5 is a downstream transfer belt 8 and an upstream intermediate belt 13. A single carriage 11 displaceable in and against the direction D carries the intermediate conveyor 13 and the downstream and upstream ends 9 and 10 of the conveyors 4 and 8, respectively, with the upstream and downstream ends 12 and 18 of the conveyor 13 respectively confronting the downstream and upstream ends 9 and 10 of the conveyors 4 and 8. An actuator shown schematically at 19 can longitudinally displace the carriage 11 between upstream and downstream positions. Motors 20 and 21 drive the conveyors 13 and 8, respectively, and are all operated by a controller 22 also connected to the drives 16 and 17. The conveyor 8 is normally operated continuously at the relatively high speed Vt or Vu by the motor 21, whereas the conveyor 13 is operated by the drive 20 either at the low speed Vs or one of the high speeds Vt or Vu. The carriage 11 is displaced by the actuator 19 at a speed Vch.

According to this invention the effective length L in the direction D of the conveyor 13 is equal to or greater than to the similarly measured length of the individual mats 6. Thus as shown in FIG. 1 a mat 6 can pass while the conveyors 4 and 13 are operating at the same slow speed Vs from the upstream conveyor onto the intermediate conveyor, which can in fact take place as the carriage 13 is moving downstream.

Figure 2:
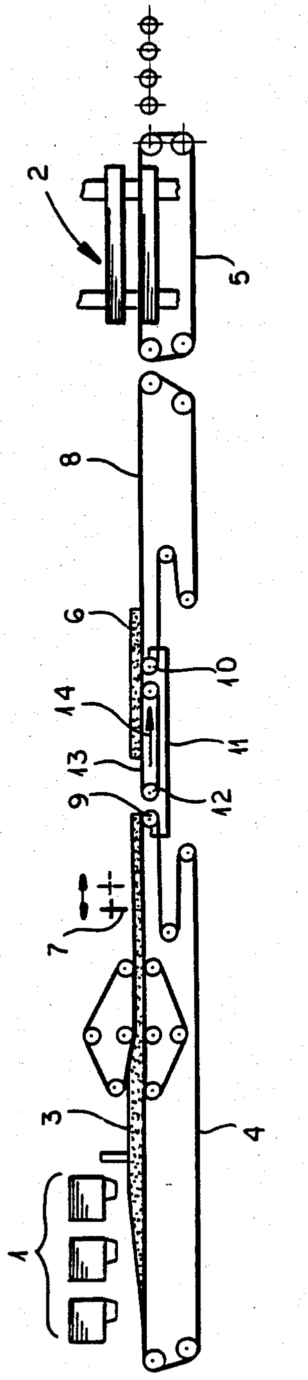

As soon as the mat 6 is completely on the intermediate conveyor, same is speeded up to the speed Vt or Vu and simultaneously the carriage 11 is shifted to the right at the speed Vch, which is to the speed Vs. This action transfers the mat at the speed Vt or Vu to the conveyor 8, forming as seen in FIG. 2 a space between it and the following mat 6. At the same time the following mat 6 is moving along on the belt 4 at the downstream end thereof at the slower speed Vs.

Figure 3:
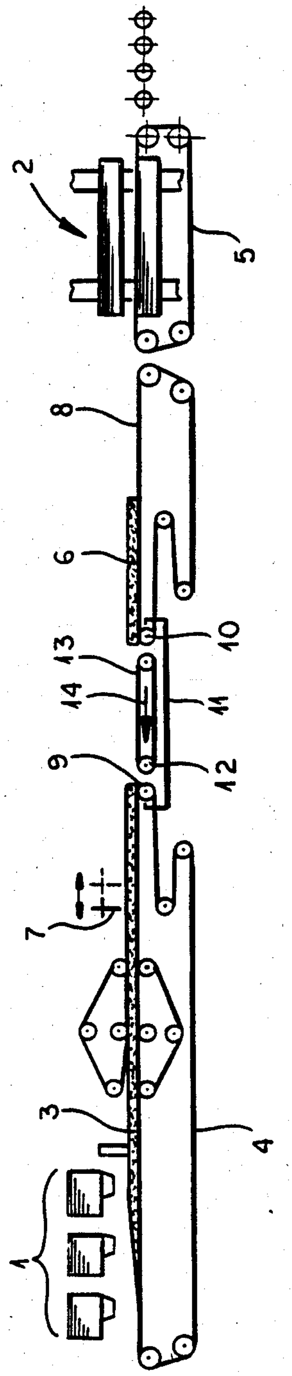
Figure 4:
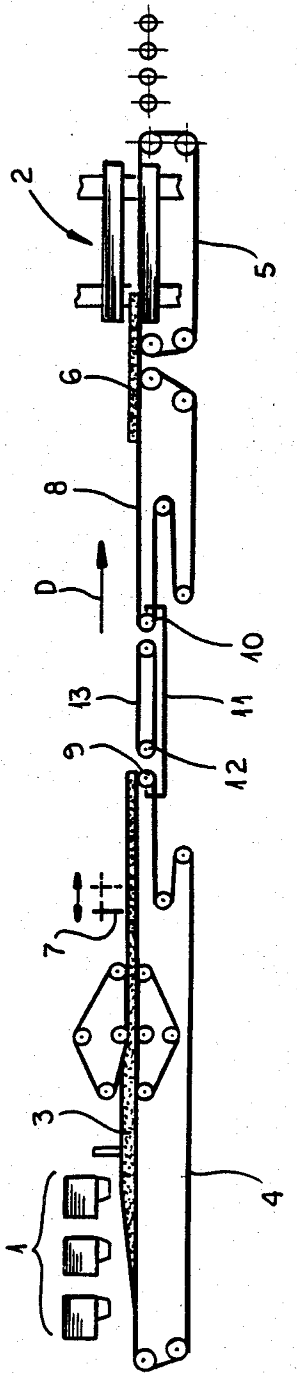

As shown in FIG. 3, as soon as the trailing edge of the mat 6 is clear of the conveyor 13, same is slowed to the speed Vs and is the carriage 11 is shifted back downstream to pick up the next mat. Meanwhile, as shown in FIG. 4, a substantial gap is formed between succeeding mats 6 so that the single-stage press 2 can be loaded and have time to close and press the mat into a panel. It is also possible as indicated by arrow 23 to make the downstream end of the transfer conveyor 8 vertically displaceable to load a multiplaten press as described in above-cited patent document No. 1,166,093.

In addition, in order to more widely space the workpieces 6, they are transferred from the conveyor 13 to the conveyor 8 at a relatively high speed Vt, and, once they are completely atop the conveyor 89, they are moved at a much higher speed Vu that is the same as the load speed for the press conveyor 5. This maximum-speed operation would coincide to the time when no mat is bridging the conveyors 13 and 8, and normally also with the cycling time of the press 2. In this manner the mats 6 are accelerated in two stages to the high speed Vu, a procedure that treats them quite gently.

I claim:

1. A method of conveying particulate mats from the downstream end of an upstream conveyor normally moving continuously in a longitudinal transport direction at a predetermined relatively slow speed to a press downstream in the direction from the upstream conveyor that receives the mats and presses them into hard panels, the method comprising the steps of:

supporting the mats between the upstream conveyor and the press on a downstream conveyor having an upstream end spaced downstream from the downstream end and a downstream end at the press and an intermediate conveyor extending between the upstream end of the downstream conveyor and the downstream end of the upstream conveyor and having a length in the direction at least equal to that of each of the mats in the direction;

reciprocating a carriage supporting the downstream end of the upstream conveyor, the intermediate conveyor, and the upstream end of the downstream conveyor in the direction at a frequency related to mat size and speed;

operating the upstream conveyor generally only at a first relatively slow transport speed in the direction;

operating the downstream conveyor generally always at a substantially higher transport speed in the direction; and operating the intermediate conveyor at the slow speed when a mat is bridging it and the upstream conveyor and for operating it at the higher speed when a mat is bridging it and the downstream conveyor.

2. The method defined in claim 1 wherein when the carriage is reciprocated it is moved downstream at a rate equal to or greater than the slow speed.

* * * * *